(12) United States Patent
Simon

(10) Patent No.: US 7,975,087 B2
(45) Date of Patent: Jul. 5, 2011

(54) CONTROL AND COMMUNICATION UNIT BETWEEN A TERMINAL AND A MICROCIRCUIT CARD

(75) Inventor: Arnaud Simon, Guyancourt (FR)

(73) Assignee: Compagnie Industrielle et Financiere D'Ingenierie "Ingenico", Pateaux (FR)

( * ) Notice: Subject to any disclaimer, the term of this patent is extended or adjusted under 35 U.S.C. 154(b) by 143 days.

(21) Appl. No.: 11/994,755

(22) PCT Filed: Jul. 5, 2006

(86) PCT No.: PCT/FR2006/001594
§ 371 (c)(1),
(2), (4) Date: Jul. 23, 2008

(87) PCT Pub. No.: WO2007/006912
PCT Pub. Date: Jan. 18, 2007

(65) Prior Publication Data
US 2009/0144473 A1 Jun. 4, 2009

(30) Foreign Application Priority Data
Jul. 6, 2005 (FR) .................................... 05 07207

(51) Int. Cl.
*H04B 1/38* (2006.01)
(52) U.S. Cl. ....................... 710/266; 455/558
(58) Field of Classification Search ............... 710/11, 710/52–57, 301–302, 260–269, 316; 714/732; 455/558
See application file for complete search history.

(56) References Cited

U.S. PATENT DOCUMENTS

| | | | | |
|---|---|---|---|---|
| 4,071,704 A | * | 1/1978 | Moed | 714/714 |
| 4,672,613 A | * | 6/1987 | Foxworthy et al. | 714/763 |
| 5,787,101 A | | 7/1998 | Kelly | 371/49.1 |
| 6,098,888 A | | 8/2000 | Praden | 235/492 |
| 6,130,917 A | * | 10/2000 | Monroe | 375/295 |
| 6,446,232 B1 | * | 9/2002 | Chan et al. | 714/746 |

(Continued)

FOREIGN PATENT DOCUMENTS
FR   2 740 240 A   4/1997

OTHER PUBLICATIONS

International Preliminary Report on Patentability from counterpart foreign Application No. PCT/FR2006/001594 filed Jul. 5, 2006.

(Continued)

*Primary Examiner* — Paul R Myers
(74) *Attorney, Agent, or Firm* — David D. Brush; Westman, Champlin & Kelly, P.A.

(57) ABSTRACT

A control and communication unit is provided between a terminal and at least one microcircuit card. The unit includes a control module for a number of input signals to the card; a module for generation of a number of time diagrams for the card communication protocols; a request generation module for transmission and reception of characters based on information received from the control module, the requests being transmitted to an external module; and an interruption generation module for creating an interruption in the case of an error in a time diagram or a character received or transmitted, based on information received from the control module and for processing the interruption without a loss of characters. The generation of an interruption does not cause an interruption in the process of request generation.

9 Claims, 2 Drawing Sheets

U.S. PATENT DOCUMENTS

| | | | | |
|---|---|---|---|---|
| 6,584,326 | B1 | 6/2003 | Boydston et al. | 455/558 |
| 6,836,814 | B2 * | 12/2004 | Takaoka et al. | 710/316 |
| 7,069,346 | B2 * | 6/2006 | Lee | 709/250 |
| 7,350,714 | B2 * | 4/2008 | Wallace et al. | 235/487 |
| 7,369,982 | B2 * | 5/2008 | Leaming | 703/25 |
| 7,555,589 | B2 * | 6/2009 | Kang | 710/305 |
| 2005/0077355 | A1 | 4/2005 | Yamamoto et al. | 235/939 |

OTHER PUBLICATIONS

International Search Report from counterpart foreign Application No. PCT/FR2006/001594 filed Jul. 5, 2006.

* cited by examiner

CONTROL AND COMMUNICATION UNIT BETWEEN A TERMINAL AND A MICROCIRCUIT CARD

CROSS-REFERENCE TO RELATED APPLICATIONS

This Application is a Section 371 National Stage Application of International Application No. PCT/FR2006/001594, filed Jul. 5, 2006 and published as WO 2007/006912 A3 on Jan. 18, 2007, not in English.

FIELD OF THE DISCLOSURE

This disclosure relates to a unit for the command and communication between a terminal and at least one microcircuit card.

It is part of the field of digital electronic components.

BACKGROUND OF THE DISCLOSURE

Command and communication units capable of managing data exchanges between a terminal and a microcircuit card are known. In the event of detection of an error during the transmission, traditional command and communication units generally cause an interruption.

However, in the time required for the interruption to be dealt with, the data transmission continues and may therefore no longer be managed and data is lost.

SUMMARY

A unit is proposed for the command and communication between a terminal and at least one microcircuit card, distinguished in that it comprises:
  a module for piloting a plurality of input signals from the microcircuit card;
  a module for generating a plurality of time diagrams relative to the communication protocols of the microcircuit card;
  a module for generating character transmitting and receiving requests from data received from the pilot module, wherein these requests are addressed to an external module; and
  a module for generating interruptions, capable of creating an interruption in the event of an error in a time diagram or on a character transmitted or received, from information received from the pilot module, and of processing this interruption without loss of characters, wherein the generation of an interruption does not interrupt the request generation process.

Consequently, an embodiment of the invention permits the reception and transmission of data to be continued between the terminal and the microcircuit card even when an error is detected in a time diagram or in a character transmitted or received and an interruption is caused, without any loss of characters. By "character", it is typically meant in this case a series of bits comprising a start bit, a certain number of data bits (for example one octet), a parity bit and an end bit.

Due to the concomitant processing of the transmission of characters and interruptions, an embodiment of the invention is particularly suited to real time systems.

Furthermore, an embodiment of the invention eliminates precision constraints to be respected on the time diagrams by the card, as they are checked by the command and communication unit during the character exchange.

Moreover, the central processing unit in the command and communication unit of an embodiment of the invention does not intervene during the exchange of characters between the terminal and the card, which considerably alleviates the processing to be done.

According to one specific feature, the module for generating the time diagrams is adapted to program the values of a plurality of time diagrams and to configure the diagrams in an activated or deactivated state. This confers the command and communication unit with a high upgrade capacity, to follow the developments of standardization. This avoids having to change hardware in field equipment when standards change.

The command and communication unit proposed complies especially, not only with the ISO 7816-3 standard, but also with the EMV 4.0 (2000) and EMV 3.1.1 standards.

According to one specific feature, the module for generating the interruptions is adapted so that it only causes an interruption if an error occurs on a character received or transmitted once a predetermined number of characters have been received. In this way, a response may be prepared without waiting for the end of the frame (which is to say a set of characters), which is advantageous in terms of response time, if the characters required for this response are located in the frame.

The command and communication unit of an embodiment of the invention is advantageously comprised in an ASIC (Application Specific Integrated Circuit).

As a variant, it may be comprised in an FGPA (field programmable gate array) type or CPLD (complex programmable logic device) programmable electronic component.

With the same purpose as that mentioned above, an embodiment of the invention also proposes a command and communication unit that is distinguished in that it comprises at least two command and communication units as described above, wherein one of the command and communication units pilots a main microcircuit card and the other command and communication units each pilot at least one microcircuit card.

Such a module may therefore simultaneously pilot a main card and several SIM cards. For example, in the case of a bank transaction made by a customer in a shop, the main card is for example the customer's bank card and the SIM cards are those of the shop and the bank.

Still with the same purpose, an embodiment of the invention further proposes a terminal for reading microcircuit cards, distinguished in that it comprises a command and communication module as described above. Such a terminal has the same advantages as those mentioned above related to the command and communication unit and the command and communication module.

BRIEF DESCRIPTION OF THE DRAWINGS

Other aspects and advantages will become clearer upon reading the following detailed description, provided by way of non-restrictive example. The description refers to the accompanying drawings, in which.

DETAILED DESCRIPTION OF ILLUSTRATIVE EMBODIMENTS

Figure 1:
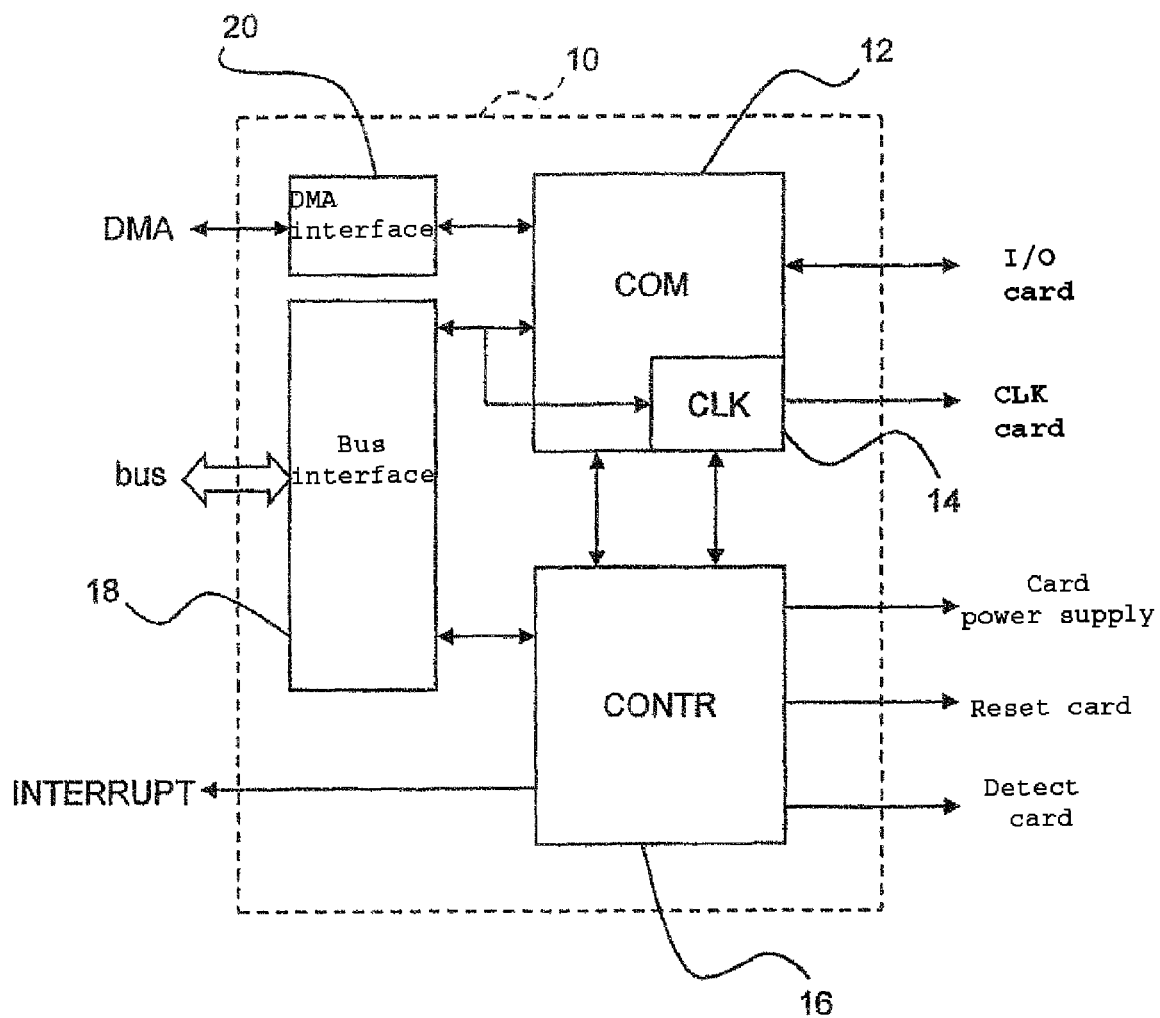
FIG. 1 diagrammatically shows a command and communication unit of the invention, in a specific embodiment.

As shown in FIG. 1, in a specific embodiment, a command and communication unit 10 of the invention, that may be included in a terminal for reading microcircuit cards, comprises a communication module 12 which manages a bidirectional series connection with a microcircuit card (not shown).

Module 12 participates in the transmission of characters to the card and the reception of characters from it. To this end, it emits transmission and reception requests addressed to an external DMA (direct multiple access) type module, capable of reading and memorising the characters received or to be transmitted.

The communication between the module 12 and the DMA is via a DMA interface 20.

The module 12 features a clock signal generator 14 which supplies a programmable frequency clock signal to command the card.

The module 12 also has the role of detecting any possible errors concerning a character, such as a parity error, a stop bit error or a stack overflow. Furthermore, it is capable of managing character repetition requests, in transmission or reception, in the event of an error.

Furthermore, the module 12 manages the interruptions related to the characters that may be created in the event of errors. It may be provided that the module 12 only causes an interruption if an error occurs on a character received or transmitted once a predetermined number of characters have been received. In this way, a response may be prepared without waiting for the end of the frame (which is to say a set of characters), which is advantageous in terms of response time, if the characters required for this response are located in the frame.

The communication module 12 and its clock signal generator 14 are connected to a command module 16, which also participates in the transmission and reception of the characters by commanding the module 12.

Furthermore, the module 16 has as functions notably the generation of a plurality of time diagrams related to the card communication protocols, commanding the electrical power supply to the card, detecting the presence of a card in the card reading terminal, deactivating the card if it is withdrawn or pulled out of the former or if there is an electrical problem, commanding the initialization or the reset of the card, verifying the intervals between characters and other time constraints related to the transmission and reception of characters, generating interruptions and managing the interruptions related to the time diagrams.

By way of non-restrictive examples, the module 16 creates time diagrams related to the following parameters:

reset response (ATR timing): the minimum and maximum values of the reset response time are programmable and are controlled by the module 16, which creates an interruption particularly if, during transmission, one of these values is outside of a predetermined range, without this interrupting the processing of the characters;

maximum waiting time between a transmission phase and a reception phase (block waiting time): the maximum value of the waiting time is programmable and controlled by the module 16, which creates an interruption if, during transmission, this value exceeds a predetermined value, without this interrupting the processing of the characters;

character waiting time: this time is programmable and controlled by the module 16, which creates an interruption if, during transmission, it exceeds a predetermined value, without this interrupting the processing of the characters;

waiting time between two phases (reception or transmission, then reception) (work waiting time): this time is controlled by the module 16;

minimum guard time between a transmission phase and a reception phase (block guard time): this time is programmable and controlled by the module 16, which creates an interruption if, during transmission, this time is below a predetermined value, without this interrupting the processing of the characters;

reverse delay (passage from a reception phase to a transmission phase): this time is programmable and controlled by the module 16.

Moreover, the module 16 is adapted to configure the various time diagrams in an activated or deactivated state, wherein the deactivated state means that the parameter defined by the corresponding time diagram is absent.

The communication module 12 and the command module 16 form means of piloting a plurality of input signals from the card, including principally: power supply signals (voltage Vdc and earth Gnd), clock signal, reset and characters input/output.

The communication module 12, its clock signal generator 14 and the command module 16 are connected to a communication bus via a bus interface 18, to communicate with the DMA. The bus and the interface 18 are for example of the APB (ARM bus peripheral) type.

Figure 2:
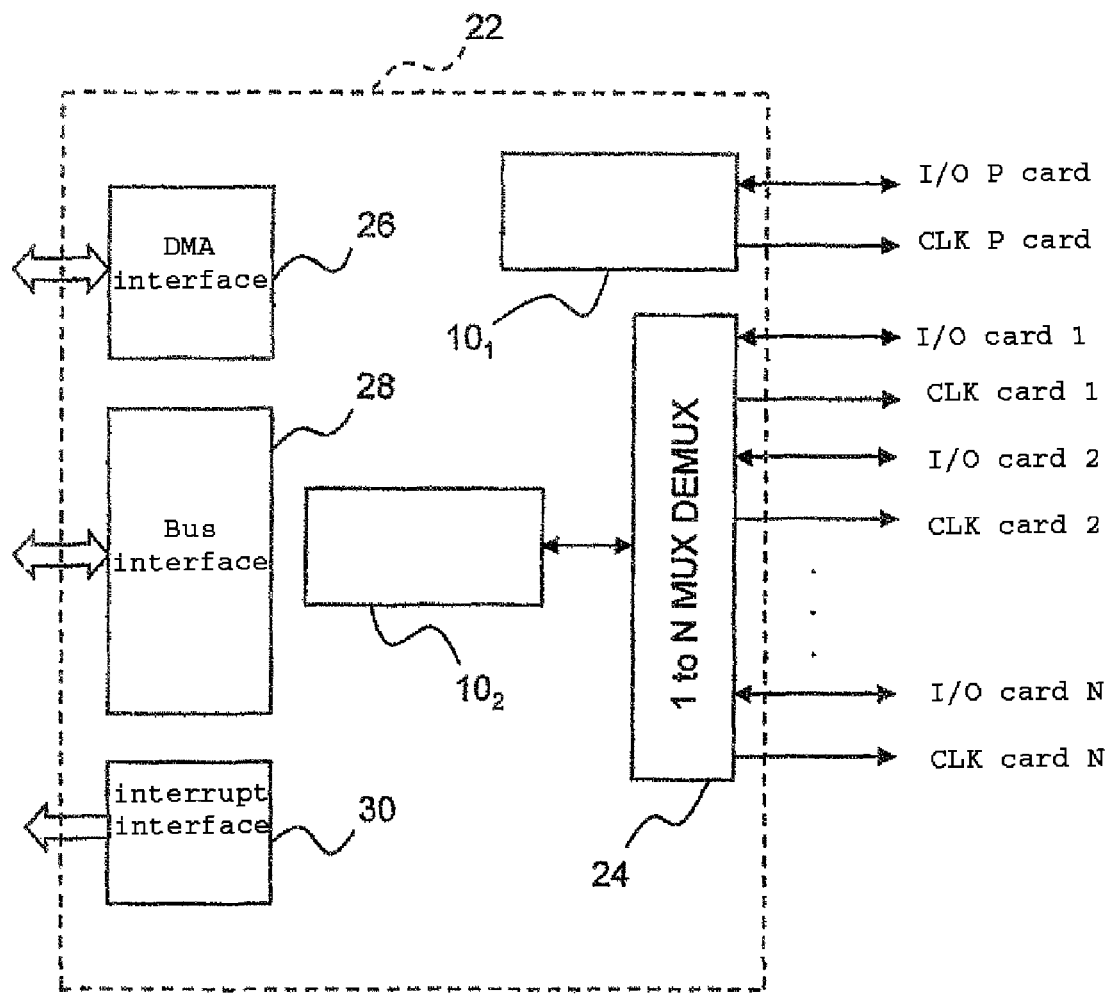
FIG. 2 diagrammatically shows a command and communication module featuring two command and communication units of the type illustrated in FIG. 1, in a specific embodiment.

In order to be able to pilot several microcircuit cards simultaneously, a plurality of command and communication units of the type of the unit 10 in FIG. 1 may be integrated in a command and communication module. FIG. 2 illustrates the case where a command and communication module 22 comprises two command and communication units 101 and 102.

The unit 101 pilots a microcircuit card (reference card P" in the drawing) and unit 102 pilots N microcircuit cards such as SIM (subscriber identification module) cards.

To permit the unit 102 to pilot N cards, the module 22 comprises a multiplexing/demultiplexing unit 24. By way of example that is in no way restrictive, N=4. The module 22 is thus capable of simultaneously piloting one main card and four SIM cards by means of two command and communication units of an embodiment of the invention. Not increasing the total number of command and communication units inside a same command and communication module permits the electronic component to remain compact.

Similarly to the structure of a command and communication unit 10, the command and communication module 22 further comprises an interface 26 to communicate with a DMA, a bus interface 28 to communicate with the different elements of the module 22 and the DMA via a communication bus and an interface 30 to manage the interruptions.

The command and communication module 22 may be comprised in a terminal for reading microcircuit cards.

Although the present disclosure has been described with reference to one or more examples, workers skilled in the art will recognize that changes may be made in form and detail without departing from the scope of the disclosure and/or the appended claims.

The invention claimed is:

1. Unit for command and communication between a terminal and at least one microcircuit card, wherein the unit comprises:
   means for piloting a plurality of input signals, including transmission and reception of characters to and from said at least one microcircuit card;
   means for generating a plurality of time diagrams that are based on parameters representing time constraints related to the transmission and reception of the characters according to a communication protocol of said at least one microcircuit card;

means for generating character transmitting and receiving requests from information received from said means for piloting, wherein said requests are addressed to an external module; and means for generating an interruption in the event of a violation of the time constraints or on a character transmitted or received, from information received from the means for piloting, and for processing said interruption without interrupting the transmission and reception of the characters, and wherein the generation of an interruption does not interrupt generation of the character transmitting and receiving requests.

2. Command and communication unit according to claim 1, wherein said means for generating the time diagrams are adapted to program values of a plurality of the parameters and to configure said time diagrams to an activated or deactivated state.

3. Command and communication unit according to claim 1, wherein said means for generating an interruption are adapted to cause an interruption if an error occurs on a character received or transmitted only once a predetermined number of characters have been received.

4. Command and communication unit according to claim 1, wherein the unit complies with the EMV 4.0 (2000), EMV 3.1.1 and ISO 7816-3 standards.

5. Command and communication unit according to claim 1, wherein the unit is comprised in an ASIC.

6. Command and communication unit according to claim 1, wherein the unit is comprised in a programmable electronic component.

7. Command and communication module comprising at least two command and communication units according to claim 1, wherein one of the command and communication units pilots a main microcircuit card and the other command and communication units each pilot at least one microcircuit card.

8. Terminal for reading microcircuit cards, wherein the terminal comprises a command and communication module according to claim 7.

9. A method for implementing command and communication between a terminal and at least one microcircuit card, wherein the method comprises:

piloting a plurality of input signals, including transmission and reception of characters to and from said at least one microcircuit card;

generating a plurality of time diagrams based on parameters representing time constraints related to the transmission and reception of the characters according to a communication protocol of said at least one microcircuit card;

generating character transmitting and receiving requests from information received from the piloting step, wherein said requests are addressed to an external module; and generating an interruption in the event of a violation of the time constraints or on a character transmitted or received, from information received from the piloting step, and processing said interruption without interrupting the transmission and reception of the characters, wherein the step of generating an interruption does not interrupt the step of generating character transmitting and receiving requests.

* * * * *